(12) United States Patent
Brueckner

(10) Patent No.: US 10,391,855 B2
(45) Date of Patent: Aug. 27, 2019

(54) AIR CONTROL SYSTEM FOR VEHICLES AND ASSEMBLY METHOD

(71) Applicant: HBPO GmbH, Lippstadt (DE)

(72) Inventor: Reinhold Brueckner, Herzebrock-Clarholz (DE)

(73) Assignee: HBPO GMBH (DE)

( * ) Notice: Subject to any disclaimer, the term of this patent is extended or adjusted under 35 U.S.C. 154(b) by 0 days.

(21) Appl. No.: 15/533,358

(22) PCT Filed: Dec. 3, 2015

(86) PCT No.: PCT/EP2015/078486
§ 371 (c)(1),
(2) Date: Jun. 5, 2017

(87) PCT Pub. No.: WO2016/087570
PCT Pub. Date: Jun. 9, 2016

(65) Prior Publication Data
US 2017/0326967 A1    Nov. 16, 2017

(30) Foreign Application Priority Data

Dec. 3, 2014   (DE) .................. 10 2014 117 817

(51) Int. Cl.
*B60K 11/04* (2006.01)
*B60K 11/08* (2006.01)
*F01P 7/10* (2006.01)

(52) U.S. Cl.
CPC ............ *B60K 11/04* (2013.01); *B60K 11/085* (2013.01); *F01P 7/10* (2013.01); *Y02T 10/88* (2013.01)

(58) Field of Classification Search
CPC ....... B60K 11/085; B60K 11/04; B60K 11/08; Y02T 10/88; F01P 7/10
See application file for complete search history.

(56) References Cited

U.S. PATENT DOCUMENTS 4,926,921 A * 5/1990 Heinemann .......... B60K 11/085
160/115
6,997,240 B2  2/2006 Denk
(Continued)

FOREIGN PATENT DOCUMENTS

CN     203046875 U     7/2013
CN     103883777 A     6/2014
(Continued)

OTHER PUBLICATIONS

PCT Search Report dated Mar. 23, 2016 for PCT/EP2015/078486 filed on Dec. 3, 2015 entitled Air Control System for Vehicles and Assembly Method.
(Continued)

*Primary Examiner* — Travis C Ruby
(74) *Attorney, Agent, or Firm* — Fish IP Law, LLP

(57) ABSTRACT

A device for controlling an airstream to a radiator device of an airstream, and an assembly of same between an assembly position and an operating position. When the device is in operating position, the airstream is guided via at least one opening to the radiator device. The device includes a cover element with at least one cover means that partially closes the opening while in a closed position and at least one bearing element connected to the cover means such that when the cover element is in operating position, the cover means can be moved between an open position and a closed position, and vice versa.

10 Claims, 12 Drawing Sheets

(56) References Cited

U.S. PATENT DOCUMENTS

| | | | |
|---|---|---|---|
| 2012/0012410 A1* | 1/2012 | Hori | B60K 11/085 180/68.1 |
| 2013/0244401 A1 | 9/2013 | Tsuchiyama et al. | |
| 2013/0264133 A1* | 10/2013 | Remy | B60K 11/085 180/68.1 |
| 2014/0273806 A1* | 9/2014 | Frayer, III | B60K 11/085 454/335 |
| 2014/0284123 A1* | 9/2014 | Bourqui | B60K 11/085 180/68.1 |

FOREIGN PATENT DOCUMENTS

| | | |
|---|---|---|
| EP | 0925983 | 6/1999 |
| JP | 2008260447 | 10/2008 |

OTHER PUBLICATIONS

CN Application 201580060228.2 (CN Patent 107000576) in the name of HBPO GmbH entitled Air Control System for Vehicles and Assembly Method; First Office Action dated Nov. 19, 2018 by the State Intellectual Property Office of the People's Republic of China; 5 pages.

European Office Action dated Sep. 3, 2019 for EP Application 15804491.7 (EP 3227134) in the name of HBPO GmbH entitled Air Control System for Vehicles and Assembly Method (German and English translations).

* cited by examiner

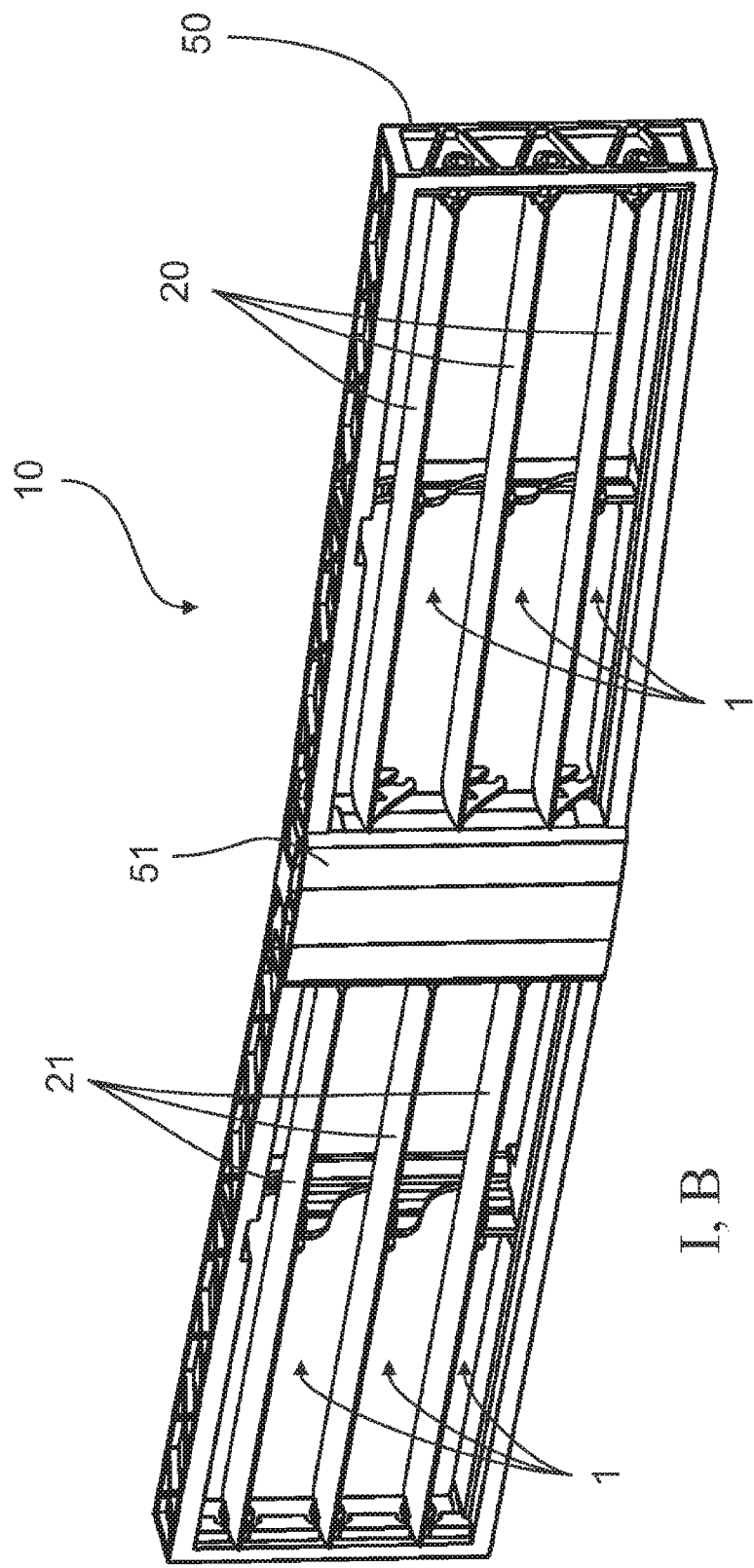

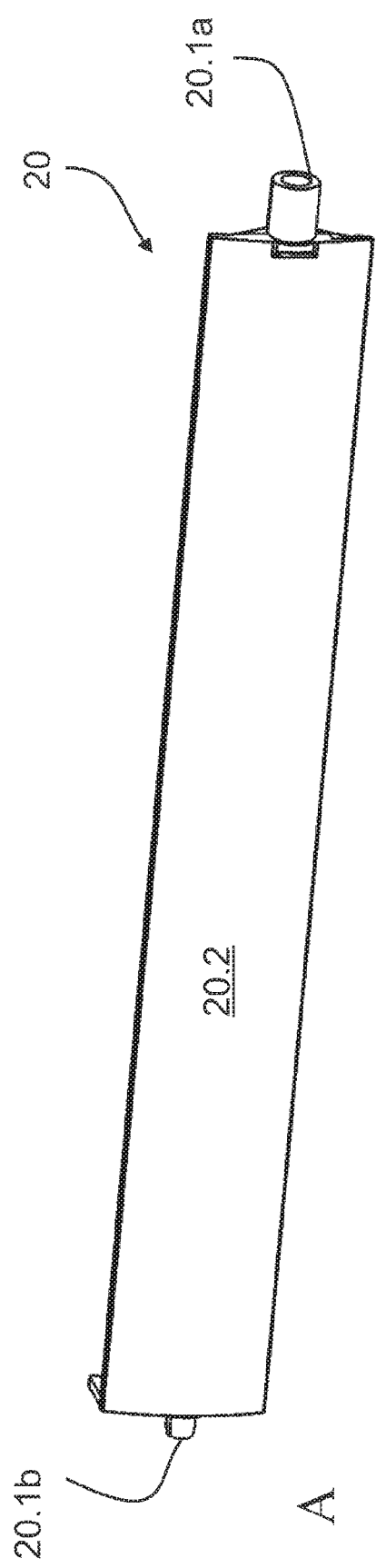
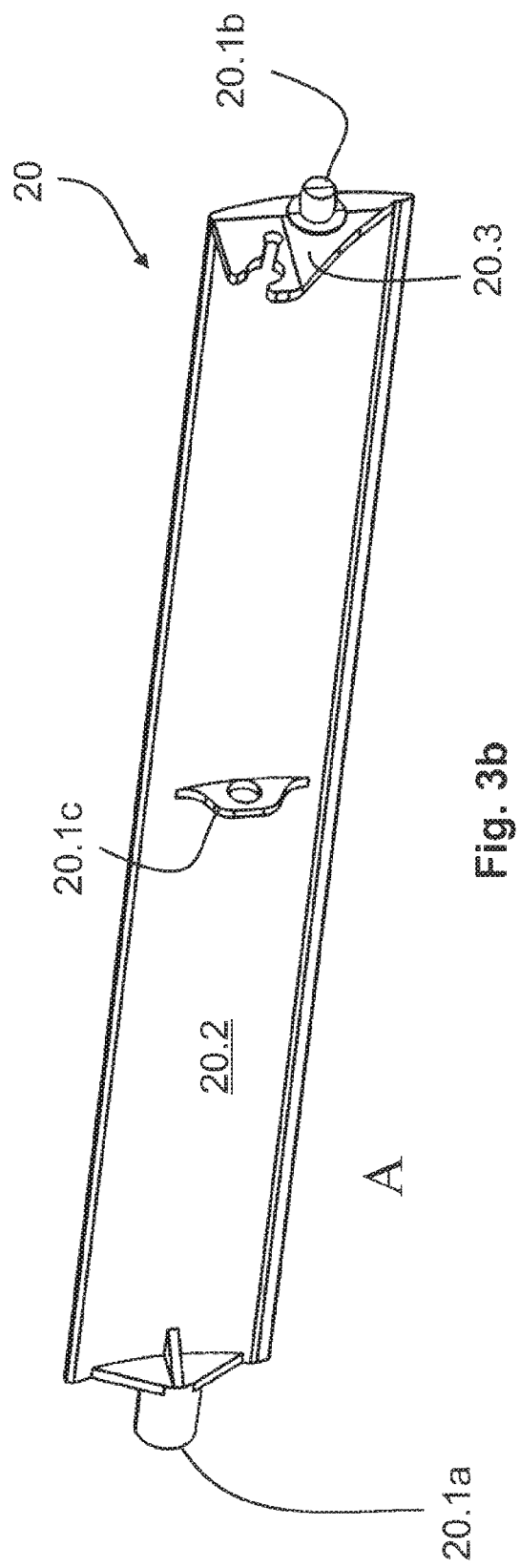
Fig. 3a
Fig. 3b

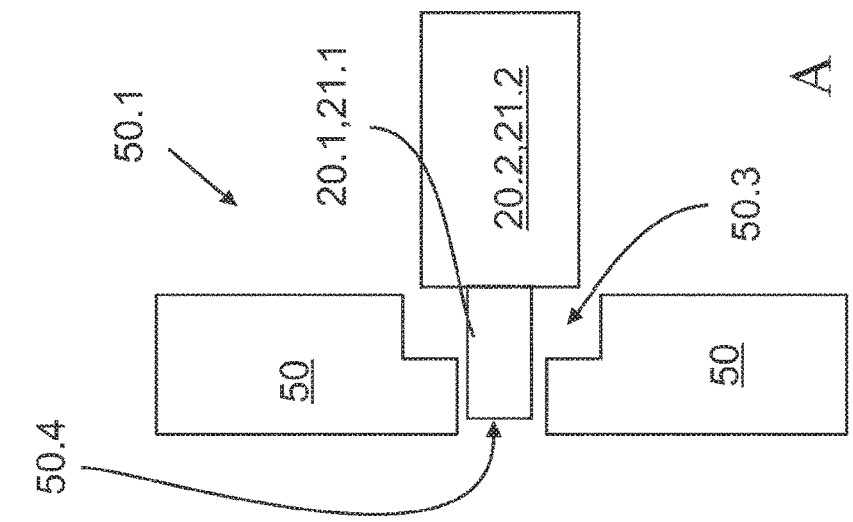
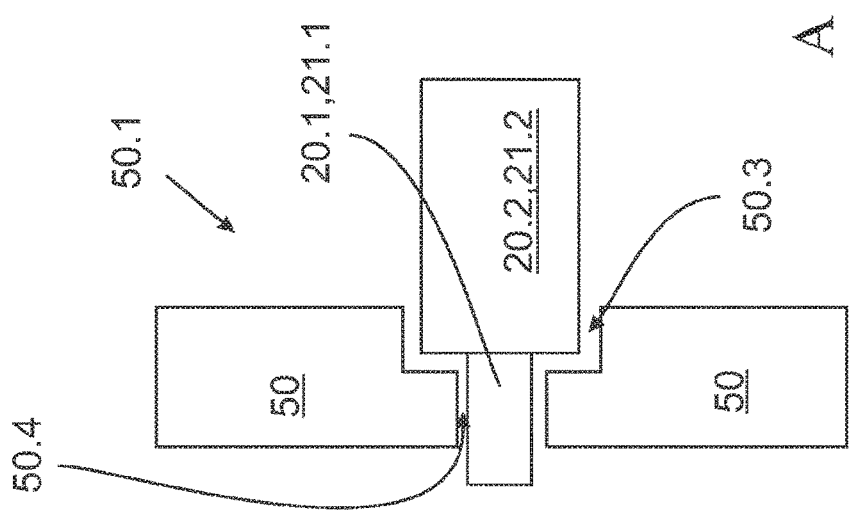
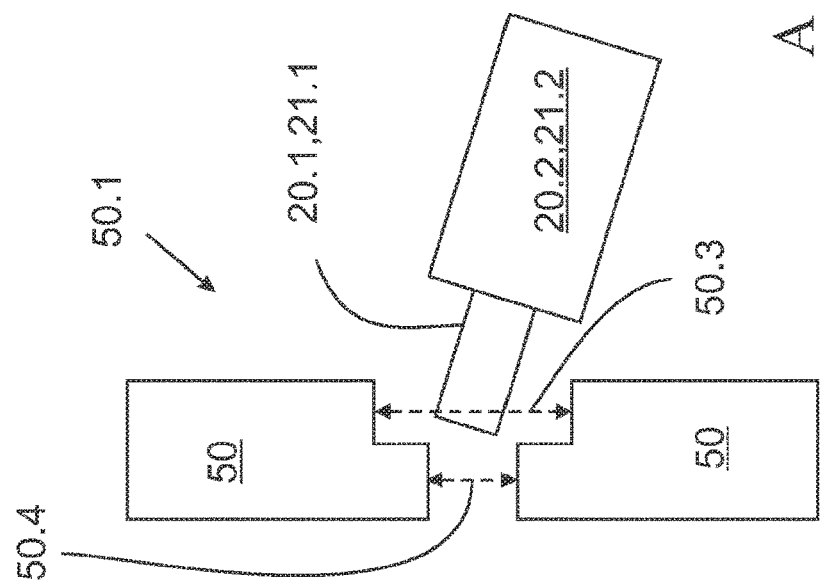

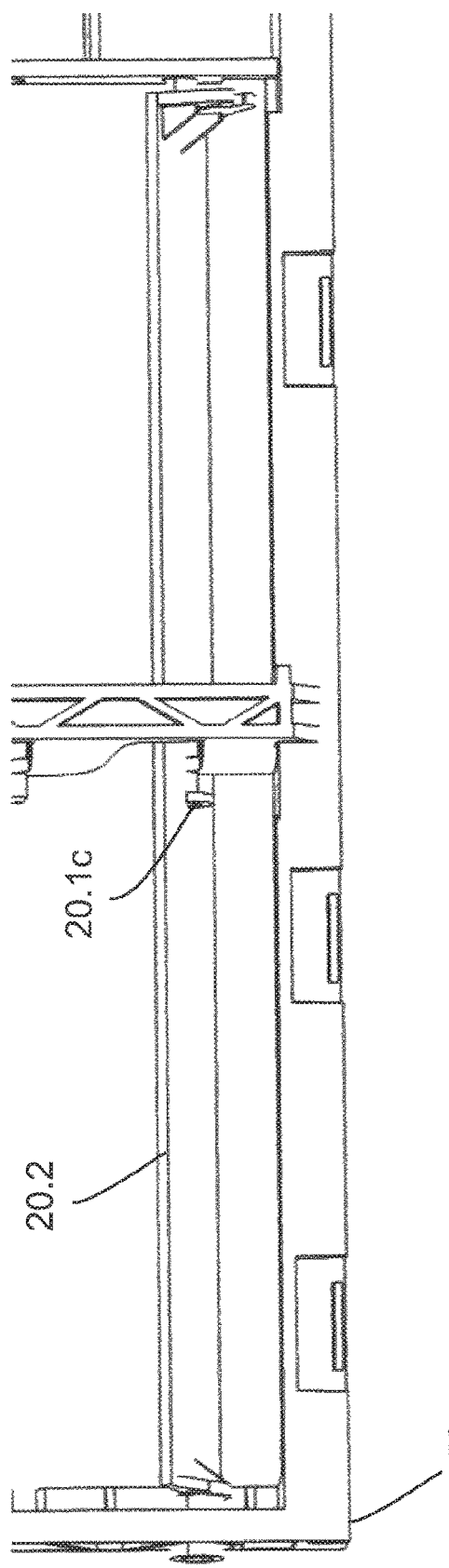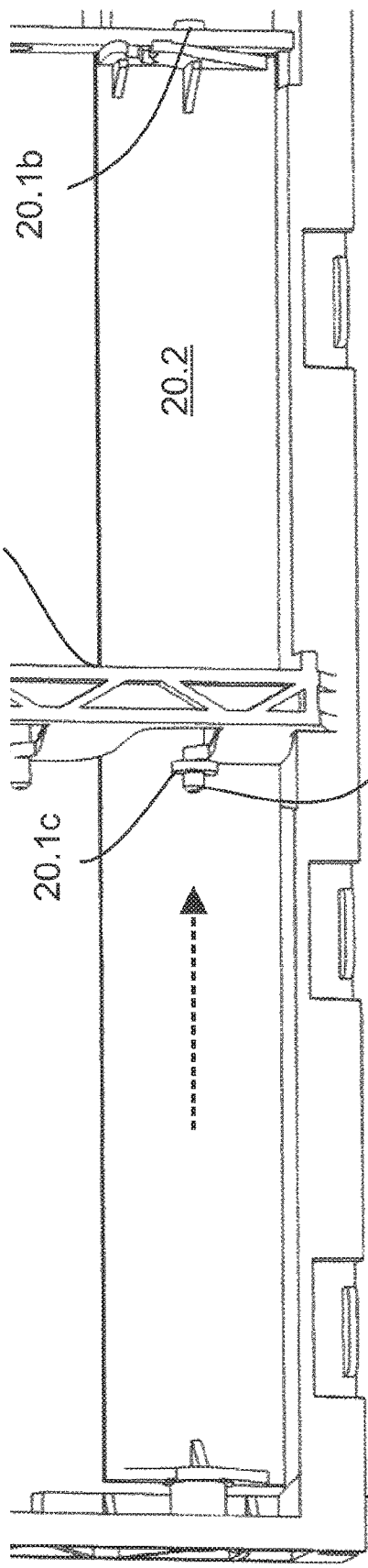

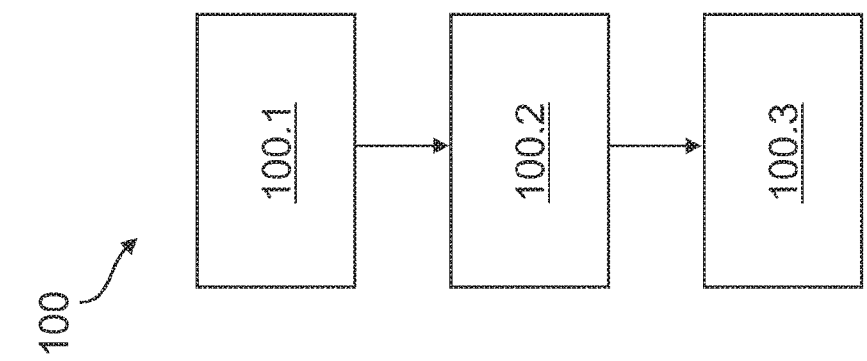
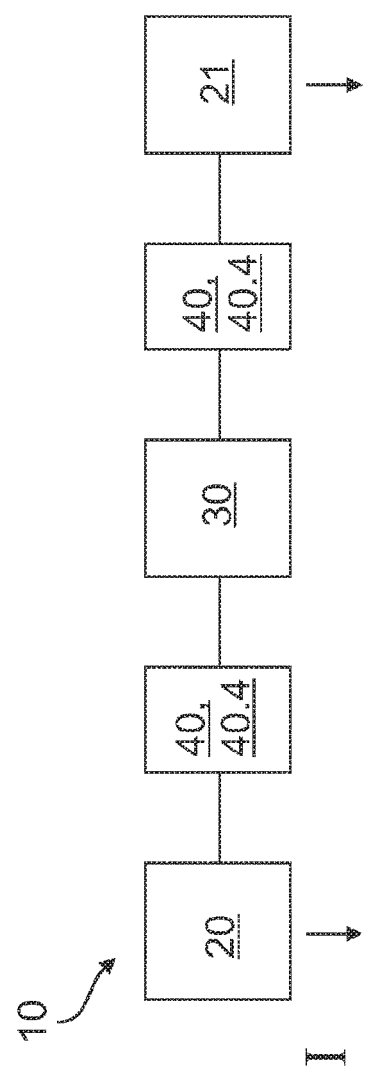
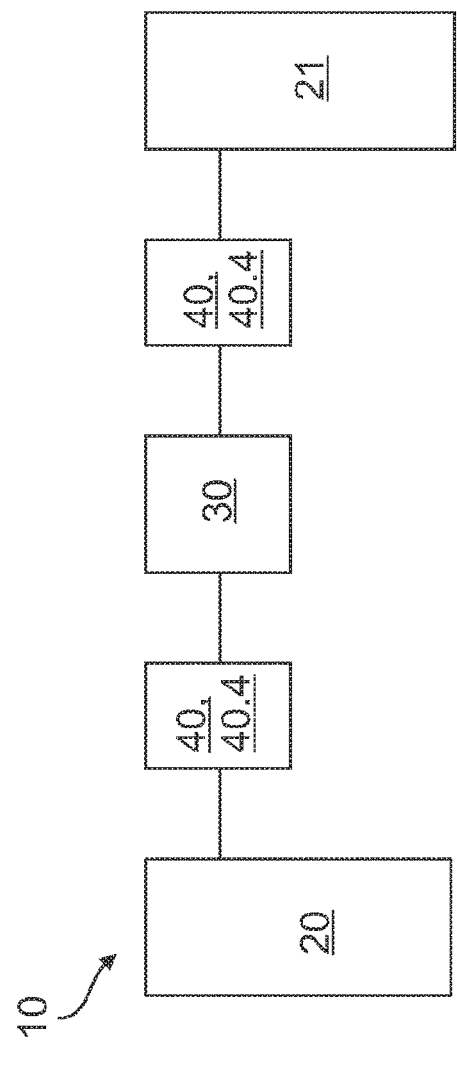

AIR CONTROL SYSTEM FOR VEHICLES AND ASSEMBLY METHOD

FIELD OF THE INVENTION

The invention relates to a device for controlling an airstream to a radiator device of a vehicle and an assembly method thereof.

BACKGROUND

It is known from the state of the art that in vehicles, particularly motor vehicles, fresh air enters through openings of the vehicle, like for example a radiator grill, and the air stream is guided to the radiator device of the vehicle. Hereby it can be ensured that for example an engine of the vehicle is efficiently and reliably cooled and/or that the vehicle interior can be efficiently air conditioned. Thereby a device for the regulation of the airstream can be used in order to at least partially close openings of the vehicle via cover elements and therewith to at least partially avoid an air entry. This effects that for example an air cushion is reduced, the cold run phase is shortened and the operating temperature of the engine is reached faster. Therewith the $CO^2$ emission of the vehicle is reduced and the cw-value (drag coefficient of the vehicle) can be optimized.

Disadvantageously with known solutions for such devices for controlling the airstream is that these are complex in the production and assembly. Particularly an assembly of the cover elements at the carrier is extensive, wherein the cover elements have to be introduced in corresponding bearing acceptances in a carrier of the device for a pivotable bearing. This is often connected to additional working steps for example the removal and renewed fastening of elements of the carrier which enable the insertion of the cover elements. Often the cover elements have to be hidden elastically for the assembly by an influence of force in order to shorten those in a longitudinal direction such that an assembly is enabled in a closed carrier. Hereby the risk occurs for a damage of the cover elements due to the bending, wherein additionally the assembly is difficult, error-prone and complicated.

It is therefore the object of the present invention to at least partially avoid the previously described disadvantages. Particularly it is the object of the present invention to enable a simplified, secure and fast and moreover error-free assembly.

SUMMARY OF THE INVENTION

The previous object is solved by a device with the features of claim 1 and an assembly method with the features of claim 11. Further features and details of the invention result from the respective dependent claims, the description and the drawings. Thereby features and details which are described in connection with the device according to the invention naturally also apply in connection with the assembly method according to the invention and vice versa such that according to the disclosure of the single aspects of the invention it can always be reciprocally related to.

The device according to the invention, particularly the cool air controlling device, serves for controlling an airstream to a radiator device of the vehicle, particularly motor vehicle, wherein the airstream is guidable through at least an opening on the radiator device with a cover element, particularly first and second cover elements, wherein the cover element comprises at least a cover means for at least partially closing the opening in at least a closing direction and at least one bearing element connected to the cover element, particularly outer or first, for the movable, particularly pivotable or tiltable bearing of the cover means and/or cover elements in a particularly outer or first bearing acceptance of a carrier. Thereby, the cover element is stored in an operating position in the carrier (particularly pivotable) such that a movement of the cover element between an open position for at least partially releasing the opening and the closed position is performable. According to the invention it is intended that particularly only in an assembly position the cover means, preferably with the (for example outer or first) bearing element, is partially insertable in a free space of the bearing acceptance. The movement between the open position and the closed position of the cover elements is, thereby, preferable a torsion and/or tilting of the cover elements about its respective longitudinal axis. By the solution according to the invention the advantage is achieved that the assembly of the cover elements is simplified and can occur particularly without a mechanic bending or deformation of the cover elements or force-free. Thereby for example the free space for the acceptance of the cover means enables that an insertion of the cover element can occur without a (any kind of) shortening of the cover means in a longitudinal direction since a correspondingly configured free space in the carrier is intended and can be used as an assembly space.

Thereby, the device according to the invention, particularly a cool air controlling device, serves particularly for cooling an engine and/or for air-conditioning of the vehicle. The vehicle can be for example a motor vehicle, preferably a passenger car and/or a truck. For controlling the airstream at least two (can be assembled next to one another) cover elements, particularly first and second cover elements, are assembled, wherein preferably first cover elements on a first (for example left side) are assembled in the vehicle and second cover elements are assembled on the opposing side (for example right side) in the vehicle. Particularly, all first cover elements comprise the same horizontal or axial orientation. The same applies for second cover elements which for example comprise the same horizontal or axial orientation. The directions thereby always relate to the vehicle directions with the mounted device. Thus for example the front side of the device according to the invention is oriented in drive direction and the rear side is directed to the vehicle interior, in case the device according to the invention is assembled or installed in the vehicle.

It is further possible that at each side of the device according to the invention one, two, three and/or four or multiple cover elements are intended, wherein the cover elements of each side (meaning respective first and second cover elements) are assembled preferably in parallel to one another or one below the other. It is for example a plurality of first cover elements intended which are assembled in parallel towards one another and a plurality of second cover elements which are assembled in parallel to one another, wherein all first and second (assembled next to one another) cover elements are moved particularly in the same manner and/or at the same time in the open and closed position in order to close, particularly completely close, the opening in the closed position. The opening is for example a through-opening for fresh air at the front side of the motor vehicle for example a radiator grill and can preferably comprise the area of the device according to the invention and/or multiple opening areas at the device according to the invention through which air can be guided in the open position through the device according to the invention for example between the cover elements. Thereby the opening is at least partially released in the open position by the cover elements and in the closed position the opening is at least partially closed by the cover elements and thus an air entry is at least partially prevented. For the movement of the cover elements between the closed position and the open position it is necessary that the cover elements can be moved particularly at the same time. Hereby (in the operating position) an actuator is intended for the transfer of the movement, particularly a turning movement and/or a turning movement of the drive, in order to transfer the movement from the drive particularly evenly and/or in the same manner to the cover elements particularly to all cover elements of the device according to the invention. The cover means can thereby be configured airtight and/or massive for example as flaps, wings, lamella and/or as a blind. Further the cover means can be partially air-permeable in order to always ensure a certain supply of cooling air.

Preferably within the scope of the invention it is intended that the cover means with the, particularly first (or outer), bearing element is configured in one piece, wherein particularly the cover element is configured in one piece and/or monolithic (from one material). It is thereby preferred that the cover element, particularly all cover elements of the device according to the invention, is preferably configured with the cover means and the outer or first bearing elements and/or with all bearing elements with the cover means connected in one piece and/or monolithic for example as a (plastic) injection molding part and/or are glass fiber reinforced. Hereby the stability of the cover elements is improved, wherein at the same time the production costs can be reduced.

It is further possible that the carrier and/or the cover elements and/or the actuator is configured of one piece particularly monolithic particularly from a (plastic) injection molding part and/or glass fiber reinforced. Hereby a cost-efficient production of the device according to the invention can be realized. Thereby the carrier can for example completely enclose and store the cover elements, particularly the bearing elements, in the lateral area and/or in the upper and/or in the lower area of the device according to the invention. Likewise, the carrier can comprise a middle bar which comprises bearing acceptances for the cover elements. The middle bar and/or an actuator for a drive can additionally at least comprise a through-opening through which fresh air can enter for cooling the drive. Thereby the drive can be assembled particularly directly behind the middle bar of the carrier. Thereby a secure and reliable operation of the drive is ensured and an overheating is prevented.

Further it is possible that the cover element, particularly cover means, is configured mainly rigidly with the particularly outer or first bearing element and/or is assembled rigidly in the carrier. Particularly it is intended that the cover element, particularly cover means, is mainly rigidly configured with the outer or first and/or with the inner or further bearing element and/or can be rigidly assembled in the carrier. Hereby the advantage is achieved that a cost-efficient production of the cover elements is enabled, wherein the cover elements can be configured very robust. Likewise the glass fiber proportion can be increased with a cover element configured as a plastic part, wherein the stability is increased.

Preferably within the scope of the invention it can be intended that the bearing acceptance comprises a free space and a restriction, wherein the free space is adjusted to the form of the cover means and the restriction to the form of the bearing element (particularly geometrically), particularly such that a (turning) bearing is enabled by the bearing element in the operating position. This enables a simple and secure assembly since no bending or deformation of the cover elements is necessary for the assembly. Thereby, particularly the bearing acceptance can comprise a free space which is configured such that and comprises particularly such a great diameter or slit that an insertion of the bearing element, particularly an outer or first bearing element, and the insertion of the cover element of the bearing element is enabled. In contrary, the restriction is configured such that the insertion of the bearing element, particularly the outer or first bearing element, however not of the cover element, is performable. Hereby the restriction comprises a diameter or an acceptance which is smaller than the diameter or the extension of the cover means. Therewith, the restriction is intended as acceptance of the bearing element, particularly outer or first bearing element, and as a stop for the cover means. The free space can thereby preferably be configured by the acceptance in which the bearing element is in the operating position for the pivotable bearing. Alternatively or additionally the free space can be configured by an outer area of the bearing acceptance which for the insertion of the cover means provides an additional movement space or degree of freedom of the cover element. Thereby it can be intended that an insertion of the cover means into the free space of the bearing acceptance is only performable in a certain orientation of the cover element for example in a mainly 90° orientation.

According to a further advantage it can be intended that in the operating position an actuator for the transfer of a movement of a drive to a first cover means and/or a second cover means is releasably connected with a cover element such that a transfer into the assembly position is prevented. Thereby, the movement is particularly a turning movement or a turning movement which is generated by the drive. Besides, a transfer function of the actuator, the actuator therewith has an additional function to fix the cover means in the operating position such that a movement into the assembly position, particularly by a lateral movement, is prevented (a lateral movement at the device corresponds in the operating position to a movement along the longitudinal axis of the cover elements). Since first cover elements are assembled preferably on one first side of the device according to the invention and second cover elements are assembled preferably on a second opposing side of the device according to the invention, first and second (assembled next to one another) cover elements can be connected particularly only by one single actuator such that a movement of the first cover elements in a lateral direction is transferred to the second cover elements by the actuator and therewith likewise a movement of the second cover elements is effected in the same direction. Since for example the carrier (for example the middle bar) in the center of the device according to the invention serves as a stop and the lateral movement is limited therewith a lateral shifting of the cover means into the free space of the bearing acceptance, particularly outer or first bearing acceptance, is prevented. In order to bring the cover elements in an assembly position again the actuator has to be removed initially.

It is further possible that the actuator is connected via at least one fastening element directly with the cover element particularly force- and/or form-fittingly with an acceptance element of the cover elements. Preferably the first fastening element can be connected with the accepting element via a latching and/or clipsing connection. Particularly the connection can occur such that by a movement of the actuator generated by a drive, for example in an at least partial circular path, a turning or a tilting of the cover elements about the longitudinal axis of the cover elements is effected. Therewith the cover elements can be moved securely and reliably by the actuator between an open and closed position.

Preferably, it is possible that the cover elements are transferable and/or shiftable in the mounting position and in the operating position by an axial movement wherein in the mounting position the bearing on the carrier is canceled. Thereby preferably for the shifting and/or axial movement of the cover elements, meaning along the longitudinal axis of the cover elements, between the mounting position and the operating position the cover elements or the cover means are guided in the carrier by respectively at least a bearing element, particularly an outer or first bearing element. Likewise the lateral, axial movement preferably is supported and/or guided by support means of the carrier which are assembled in the center of the cover element. Thereby the support means particularly serve as a support plane for the cover means of the cover elements. Therewith, a secure and reliable transferring between the assembly position and the operating position is possible.

Preferably, it is possible that the carrier and/or the cover element and/or the cover means and/or the actuator are configured from an injection molding part and/or from one piece, particularly monolithic. Further it is possible that a 2K-injection molding method for the monolithic and in one piece production of said elements is used. Further it is possible that exactly one carrier and/or one actuator are intended for the device according to the invention. Further it is possible that the device according to the invention particularly the actuator and/or the cover elements at least partially are configured from glass fiber reinforced plastic and/or from a fibrous composite material. Hereby the production effort and the stability of the device can be significantly increased.

Preferably, within the scope of the invention it can be intended that the cover element is stored movably and particularly only pivotably in the operating position in the bearing acceptance of the carrier wherein particularly in the operating position at least two bearing elements of the cover elements are pivotably stored in a bearing acceptance of the carrier, respectively. The bearing acceptance of the carrier can thereby be configured as radially closed bearing guidances. Hereby the cover elements are supported reliably (and particularly form-fittingly) in the carrier in a manner that a safe movement (without lateral or axial displacement) between the open position and the closed position is enabled by a turning or tilting of the cover elements. The movement between the open position and the closed position thereby occurs preferably (only) by a turning of the cover elements about the longitudinal axis or turning axis. Thereby first elements can be assembled for example in parallel to one another wherein their longitudinal axis or turning axis comprises the same direction (or orientation). Accordingly second elements can be assembled for example on an opposing side of the carrier in parallel to one another and likewise comprise a longitudinal axis or turning axis with the same orientation.

The bearing elements of the cover elements can configure a slide bearing (or friction bearing; in German: Reiblagerung) with a corresponding bearing acceptance of the carrier such that further bearing means like for example ball bearings or such like can be avoided. For the reduction of the bearing friction a coating or an intermediate layer can be intended at the bearing elements of the cover element and/or the bearing acceptance of the carrier.

Further it is possible that in the operating position at least a first, particularly outer, bearing element of the cover element is inserted for the movable bearing of the cover means in a first, particularly outer, bearing acceptance and at least a further, particularly inner, bearing element is inserted in a further, particularly inner, bearing acceptance of the carrier. Hereby a secure and particularly complete closed bearing in the carrier is enabled. Thereby preferably in the operating position only a turning or a tilting of the cover elements is performable, wherein in the assembly position a lateral movement is performable (meaning particularly in the direction of the axis of the bearing acceptance of the carrier).

The so far described drive can comprise a drive acceptance, preferably two drive acceptances, which are intended for the forwarding of the drive movement directly at the actuator or indirectly at the at least one connecting element. Ideally, the two drive acceptances are assembled axially opposing to the drive and can serve for a rotation-steady acceptance of the (both) connecting elements. Both connecting elements (particularly in form of a crank) are in turn connected with the actuator, respectively, and transfer the inserted force/movement from the drive to the actuator. The drive itself and possibly the kinematic of the connecting elements can be configured self-locking with the actuator in order to prevent an independent adjustment of the cover elements without energy.

In order to achieve a significant assembly of the cover means in or at the carrier the diameter of the (first and second) bearing elements of the respective cover element and the complimentary configured bearing acceptance at the carrier can differ significantly (in its size) from one another, wherein an interchangeable secure assembly is given.

Likewise subject matter of the invention is an assembly method for the assembly of at least one cover element of a device for regulating an airstream to a radiator device of a vehicle, particularly a motor vehicle, wherein the airstream is guidable through at least one opening in the radiator device and the cover element comprises at least one cover means for at least partially closing the opening in at least a closed position and preferably a bearing element, particularly outer or first, connected with the cover means for the movable bearing of the cover means in a, particularly outer or first, bearing acceptance of a carrier, wherein the cover element in its operating position is supported at a carrier such that a movement of the cover element between an open position for the at least partial release of the opening and the closed position is performable. Thereby at least the cover means is assembled in an assembly position deformation-free, meaning particularly bending-free, rigidly, in one piece, monolithic and/or form-fittingly, into the carrier, preferably in a manner that a bearing in the carrier and/or movement in the operating position is enabled. Deformation-free relates hereby to a mechanic deformation or shortening in the longitudinal direction, meaning particularly that deformation or bending of the cover means (or cover elements) is not necessary in order to perform an assembly. Further, a device according to the invention can be used for the assembly method according to the invention or it can be mounted by the assembly method according to the invention. Therewith the assembly method according to the invention provides the same advantages like they are described in detail in relation to the device according to the invention.

According to a further advantage it can be intended that the assembly method comprises the following steps:

a) Deformation-free insertion of the cover element into the carrier, wherein a particularly outer first bearing element connected to the cover means is guided in a preferably outer first bearing acceptance of the carrier. Hereby the cover means is inserted in a mainly horizontal orientation. The cover means or bearing element can thereby for example from the outside be guided through a free space in form of a bearing slit into the carrier. The bearing slit is for example configured as a recess at the carrier.

b) Axial displacement of the cover means from the assembly position in the operating position, wherein a further particularly inner bearing element of the cover means is guided into a further particularly inner bearing acceptance of the carrier. Subsequently or at the same time the cover means is transferred into an adjustment particularly which differs from the mainly perpendicular adjustment particularly by a rotation about approximately 10 to 90°, particularly mainly 90°.

Thereby, with this alignment a shifting into the mounting position is prevented and therewith a safe operation is ensured.

Further, it is possible that according to step b) an arrangement of an actuator to the cover element occurs wherein a repeated transfer in the assembly position is prevented. The actuator is thereby particularly connected on one side with first cover elements and on the opposing side with second cover elements in a manner that preferably a lateral shifting or movement of the first cover element is transferred to the second cover element and vice versa. Since preferably in the center of the carrier a stop is intended (for example since the movement is limited by the laterally immovably assembled actuator) hereby the lateral movement is limited and the actuator fixes the cover elements in the operating position. Thereby a secure operation is ensured.

Preferably it can be intended that the cover means is inserted for the assembly into the assembly position in a free space of a bearing acceptance of the carrier and particularly for a transfer into the operating position guided from the free space. The free space thereby serves as an assembly space in order to prevent a bending of the cover means. However, the free space is preferably configured such that a turning of the cover element is blocked in case the cover means is at least partially in the free space. Therewith it is necessary that previously the cover means is guided from the free space in order to turn the cover elements (by a pivoting) into an operating position.

Further advantages, features and details of the invention result from the subsequent description in which embodiments of the invention are described in detail in relation to the drawings. Thereby the features described in the claims and in the description can be essential for the invention each single for themselves or in any combination.

DETAILED DESCRIPTION

Figure 1A:
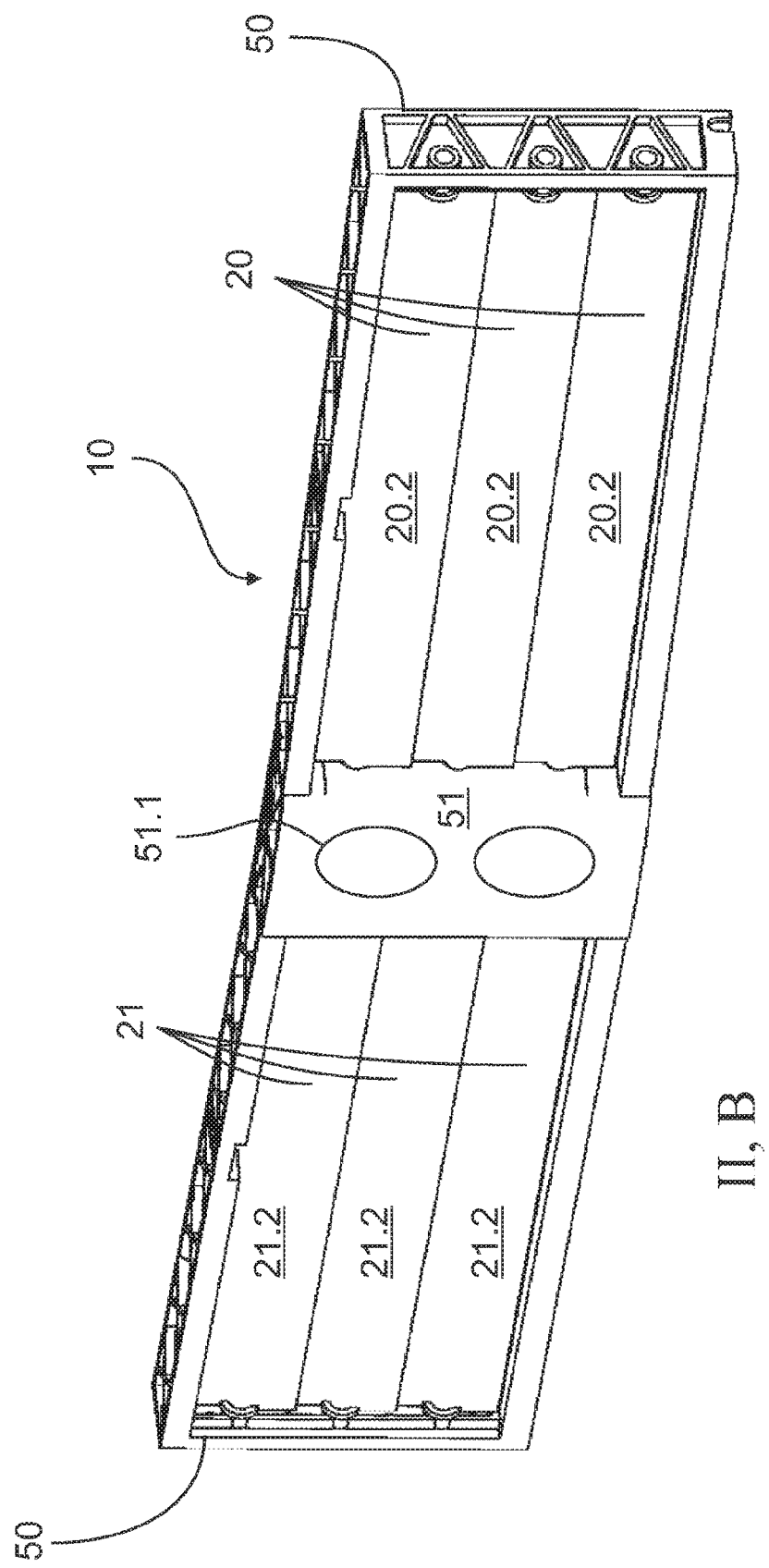
FIG. 1a a frontal view of a device according to the invention in a closed position and operating position, FIG. 1b a further frontal view of a device according to the invention in an open position and operating position, FIG. 2 a further frontal view of a device according to the invention in an assembly position, FIG. 3a a frontal view of a cover element, FIG. 3b a rear view of a cover element, FIG. 4a to FIG. 4c a schematic representation of parts of a device according to the invention, FIGS. 5a and 5b an enlarged representation of parts of a device according to the invention, FIGS. 6a and 6b a representation of parts of a device according to the invention, FIG. 7 a perspective rear view of a device according to the invention, FIG. 8 a further perspective rear view of a device according to the invention, FIG. 9 a perspective frontal view of parts of a device according to the invention, FIG. 10 a top view of parts of a device according to the invention, FIG. 11a a schematic rear view of a device according to the invention in an open position, FIG. 11b a schematic rear view of a device according to the invention in a closed position, FIG. 12 a schematic representation for visualizing method steps of the assembly method according to the invention.

The FIGS. 1a and 1b show a frontal view of a device 10 according to the invention, wherein in FIG. 1a a closed position II is shown. Thereby it can be recognized, that in the closed position II cover elements 20, 21 are closed and therewith the air entry through an opening 1 is at least partially prevented by the cover elements 20, 21. The opening 1 can for example comprise the intermediate spaces of the device 10, which are shown for example in the open position I in FIG. 1b, such that with opened cover elements 20, 21 the airstream can be guided through the device 10. Likewise it is possible that an air entry area or a radiator grill of the vehicle directly in front of the device 10 according to the invention can be interpreted as an opening 1. Further it is possible that the opening 1 comprises different opening areas, wherein to each opening area at least one (and in the whole embodiment three respectively) cover element/s 20, 21 is assigned. Thus, in FIG. 1a first cover elements 20 (on the left side in vehicle direction) and second cover elements 21 (on the right side in vehicle direction) are shown, wherein each cover element 20, 21 comprises cover means 20.2, 21.2. The cover means 20.2, 21.2 are air-impermeable and for example rigid, elastic or bendable, for example configured as blades, flaps or roller blinds, in order to affect an air-impermeable closing of the opening 1. All cover means 20.2, 21.2 or corresponding cover elements 20, 21 are assembled parallel to one another. The cover elements 20, 21 are rotatable in a carrier 50. Therewith the cover elements 20, 21 can be transferred from a closed position II, in which the cover means 20.2, 21.2 close the opening 1 or prevent the air entry into the vehicle by a turning movement in the carrier 50, into an open position I, in which the cover means 20.2, 21.2 are assembled or turned in a way, that the air entry through the opening 1 is enabled. The opening position I of the device 10 according to the invention is shown in FIG. 1b. In FIG. 1a further a center bar 51 is shown, which for example can be an integral part of the carrier 50, wherein behind the center bar 51 a drive 30 is arranged. Further the center bar 51 can comprise at least one cooling slit 51.1 for the drive 30, in order to affect a sufficient cooling by fresh air, which is guided to the drive 30 via cooling slits 51.1 and therewith ensures a secure operation of the drive 30. The device 10 is assembled thereby for example in the frontal area of the vehicle, for example in the (rear) area of the front end module of the vehicle. The front side of the device 10 is aligned to the outside of the vehicle or to the front side of the vehicle, such that with an air entry through the device 10 the air is guided into the vehicle interior. The following directions of the device 10 thereby correspond with the vehicle directions (for example the frontal side of the device 10 is aligned in driving direction and the rear side to the vehicle interior).

Figure 2:
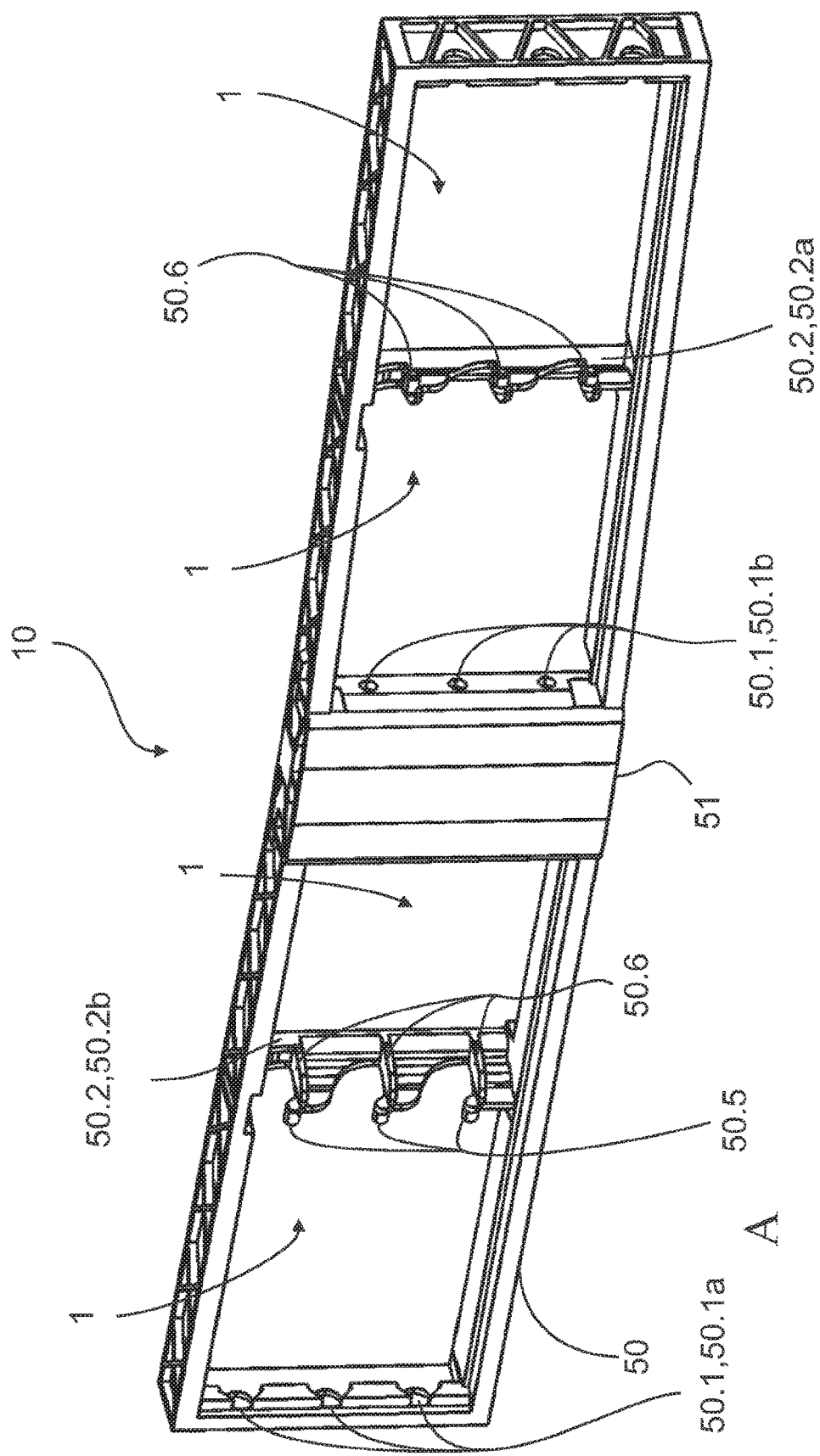

FIG. 2 shows a device 10 according to the invention in an assembly position A, wherein in the assembly position A the cover elements 20, 21 are (at least partially) outside of the bearing acceptance of the carrier 50 for example completely removed. Accordingly, in FIG. 2 the openings 1 are completely released. The carrier 50 comprises different carrier acceptances 50.1, in which the cover elements 20, 21 are inserted for mounting and in which the cover elements 20, 21 are pivotably mounted in the operating position B. According to an embodiment at the outer carrier 50 outer or first bearing acceptances 50.1$a$ and in the central area of the device 10 or the carrier 50 inner or further bearing acceptances 50.1$b$ can be intended. These correspond to the corresponding bearing element 20.1 particularly to the outer or first bearing elements 20.1$a$, 21.1$a$ and inner or further bearing elements 20.1$b$, 21.1$b$ of the cover elements 20, 21. Further, the carrier 50 comprises support elements 50.2, wherein a first support element 50.2$a$ is assembled such that it can centrally support a first cover element 20 in the operating position B, particularly in vertical direction. A second support element 50.2$b$ is arranged such that it can centrally support a second cover element 21 in the operating position B. Hereby, the support elements 50.2 comprise at least a bearing means 50.5 and at least a support means 50.6. The bearing means 50.5 are configured such that they can be form- and/or force-fittingly connected with the central bearing elements 20.1$c$, 21.1$c$ of the cover elements 20, 21 and these are possibly pivotably supported in the operating position B. The support means 50.6 comprise at least two functions: in the assembly position A they serve as a support and guidance for the cover elements 20, 21, particularly cover means 20.2, 21.2 for a movement in lateral direction (meaning in the direction of the longitudinal axis or turning axis of the cover elements 20, 21). Thereby, the cover means 20.2, 21.2 are on the support means 50.6 in case the cover elements 20, 21 are in their 90° position meaning in their open position I. In this case they are for example mainly parallel to the vehicle lower side in case the device 10, according to the invention, is assembled in the vehicle. Thereby, in the operating position B they can limit the maximum deflection of the cover elements 20, 21 meaning by reaching the 90° position or the open position I.

In FIGS. 3$a$ and 3$b$ exemplarily a cover element 20 is shown, wherein the subsequent embodiments apply at the same time for the first cover element 20 and for the second cover element 21. Initially, in FIGS. 3$a$ and 3$b$ it can be recognized that the cover element 20 (and therewith also a not shown cover element 21) comprises a cover means 20.2 (21.2) and at least a bearing element 20.1 (21.1), particularly an outer or first bearing element 20.1$a$ (21.1$a$) and an inner or further bearing element 20.1$b$ (21.1$b$). Further, centrally at the cover means 20.2 (21.2) a central bearing element 20.1$c$ (21.1$c$) can be intended. Thereby, the bearing elements 20.1 (21.1) of a cover element 20 (21) can be configured differently from one another in their geometry. Thus, for example an outer or first bearing element 20.1$a$ (21.1$a$) comprises a diameter which differs from the diameter of the inner or further bearing element 20.1$b$ (21.1$b$). Hereby it is ensured that with a mounting the cover elements 20, 21 are inserted error-free and unambiguously in a correct orientation and in the provided bearing acceptance 50.1 of the carrier 50. Accordingly, an outer or first bearing acceptance 50.1$a$ of the carrier 50 is adjusted to the configuration of an outer or first bearing element 20.1$a$ or 21.1$a$ and an inner or further bearing acceptance 50.1$b$ of the carrier 50 is adjusted to the configuration of an inner or further bearing element 20.1$b$, 21.1$b$ (for example in relation to the diameter). In FIG. 3$b$ additionally an acceptance element 20.3 can be recognized, which enables in the operating position B a form- and/or force-fitting connection with the actuator 40.

In FIGS. 4$a$ to 4$c$ schematically the single assembly steps are shown in order to transfer the device 10 according to the invention from an assembly position A into an operating position B. Thereby, in a first assembly step, which is shown in FIG. 4$a$ the cover element 20, 21 is initially angled and inserted into the carrier 50. Hereby, it has to be considered that no bending or deformation of the cover element 20, 21 is necessary. The cover element 20, 21 at least comprises a bearing element 20.1, 21.1 or an outer or first bearing element 20.1$a$, 21.1$a$ and therewith connected cover means 20.2, 21.2. Initially, only the bearing element 20.1, 21.1 of the cover element 20, 21 meaning particularly the outer of a first bearing element 20.1$a$, 21.1$a$ is inserted in the bearing acceptance 50.1, particularly an outer or first bearing acceptance 50.1$a$ of the carrier 50. Thereby, the bearing acceptance 50.1, particularly the outer or first bearing acceptance 50.1$a$, comprises a free space 50.3 and a thereto (directly) adjacent restriction 50.4. The free space 50.3 is configured such that the cover means 20.2, 21.2 and also the bearing element 20.1, 21.1, particularly the outer or first bearing element 20.1$a$, 21.1$a$, is insertable. In contrary the restriction 50.4 is configured such that only the bearing element 20.1, 21.1, particularly the outer or first bearing element 20.1$a$, 21.1$a$, is insertable. Herefore, the restriction 50.4 comprises an extension or a cross-section which is smaller than the extension or the cross-section of the part of the cover means 20.2, 21.2 which is inserted into the free space 50.3 such that an insertion of the cover means 20.2, 21.2 into the restriction 50.4 is blocked. Therewith, the restriction 50.4 serves as a stop for the cover means 20.2, 21.2 like shown in FIG. 4$b$. For the assembly the cover means 20.2, 21.2 is particularly completely introduced into the free space 50.3 of the bearing acceptance 50.1 and subsequently the cover element 20, 21 is swiveled into the carrier 50 such that the longitudinal axis of the cover means 20.2, 21.2 corresponds to the turning or tilting axis in the operating position B. Subsequently, like shown in FIG. 4$c$ the cover means 20.1, 21.1 is laid out from the free space 50.3 such that the cover means 20.2, 21.2 is particularly completely outside the free space 50.3 or the bearing acceptance 50.1 particularly the outer or first bearing acceptance 50.1$a$. Thereby, a further bearing element 20.1, 21.1, particularly an inner or further bearing element 20.1$b$, 21.1$b$, is introduced in a further bearing acceptance 50.1 particularly in an inner or further bearing acceptance 50.1$b$. In this position the cover element is pivotably or tiltably supported in the carrier 50 and can be transferred into its operating position B by rotation (for example mainly about 90°).

Figure 5B:
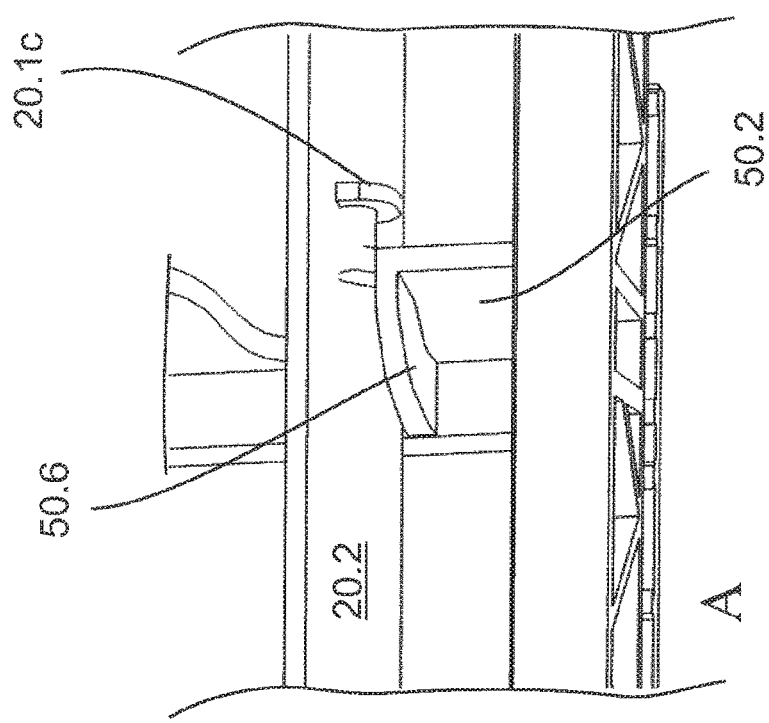
Figure 5A:
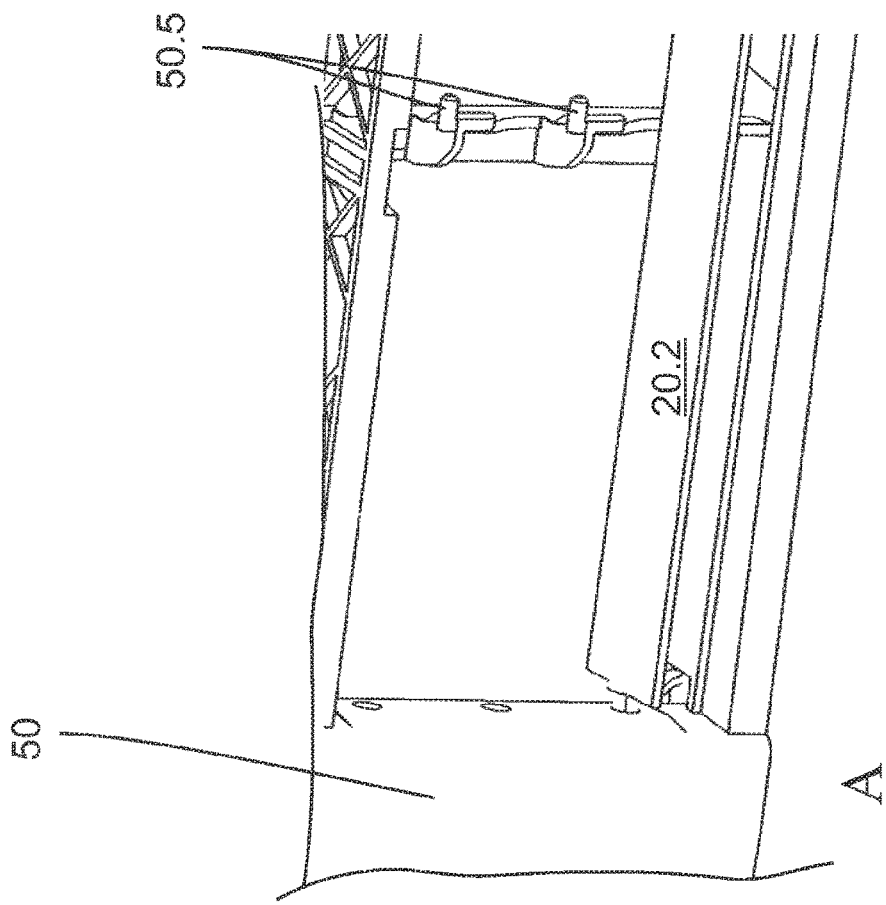

In FIGS. 5$a$ and 5$b$, the assembly of the cover elements 20, 21 is further described. Like it can be recognized here for the device 10 according to the invention a plurality of first cover elements 20 are intended, which for the assembly have to be arranged or are arranged in parallel to one another in the carrier 50, respectively. For a simplified assembly the carrier 50 comprises bearing means 50.5 and supporting means 50.6, wherein it can be seen in FIG. 5$b$ that the supporting means 50.6 are suitable as a supporting area for the cover means 20.2, 21.2 and thereby a lateral shifting is simplified and guided (in direction of the longitudinal axis of the cover elements 20, 21). By this shifting further the bearing means 50.5 are pushed into the central bearing elements 20.1c, 21.1c provided in the cover means 20.2, 21.2 (configured as an acceptance).

In FIGS. 6a and 6b the previously described assembly is illustrated, wherein an introduced cover element 20, 21 is radially shifted along the longitudinal axis like shown by an arrow in FIG. 6b. Therewith, an inner or further bearing element 20.1b, 21.1b is shifted into a corresponding inner or further bearing element 50.1b of the carrier 50 and a central bearing element 20.1c is connected with a corresponding bearing means 50.5 of the carrier 50. This enables a pivotable or tiltable bearing of the cover elements 20, 21 in the carrier 50.

Figure 7:
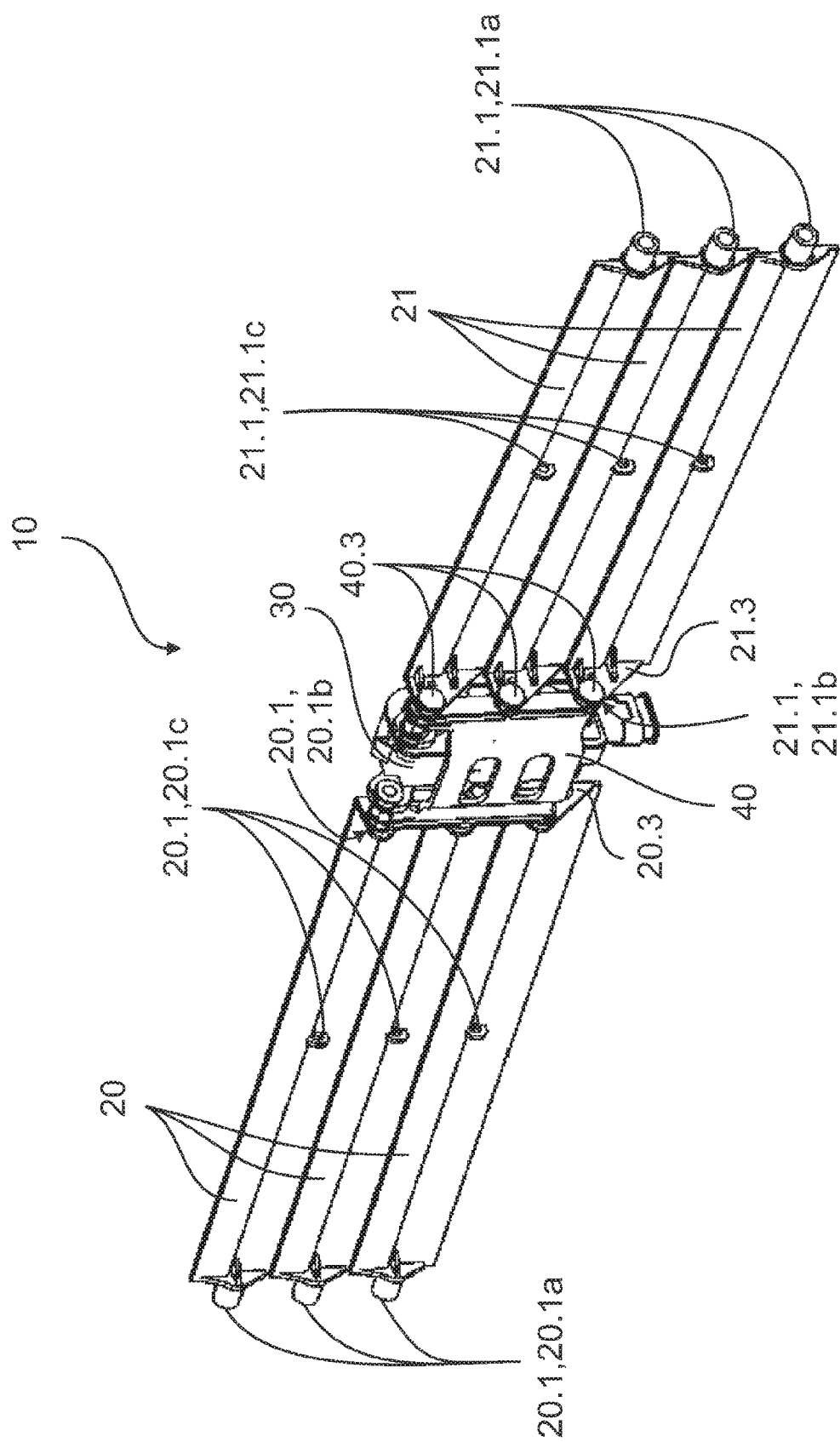

In FIG. 7 a perspective rear view on parts of a device 10 according to the invention is shown, wherein the carrier 50 is not shown. The device 10 according to the invention comprises thereby first cover elements 20 and second cover elements 21, wherein bearing elements 20.1 of the first cover elements 20 and bearing elements 21.1 of the second cover elements 21 are shown. Hereby, it can be recognized that the actuator 40 is connected on one side centrally with the first cover elements 20 (via receiving elements 20.3) and on the opposing side centrally with the cover elements 21 (via receiving elements 21.3). A movement of the actuator 40 particularly along a (partial) circular path (for example in a plane parallel to the driving direction) is therewith transmitted to the first cover elements 20 and to the second cover elements 21 via the actuator 40. At the same time, the first cover elements 21 are connected towards one another via the actuator 40 and the second cover element 22 are likewise connected to one another via the actuator 40. Since the cover elements 20, 21, particularly the cover means 20.2, 21.2, are pivotably mounted in the carrier 50 via bearing elements 20.1, 21.1 the movement of the actuator 40 along the circular path is transmitted in a turning movement of the cover elements 20, 21 (or each single cover means 20.2, 21.2). A single cover element 20, 21 comprises therewith a cover means 20.2, 21.2 and at least two bearing elements 20.1, 21.1 on opposing sides, respectively. For example comprises the single first cover element 20 a first or outer bearing element 20.1a and a further inner bearing element 20.1b on the opposing side of the cover means 20.2 of the cover element 20. The bearing elements 20.1, 21.1 comprise for example the outer or first bearing elements 20.1a, 21.1a, central bearing elements 20.1c, 21.1c and the inner or further bearing elements 20.1b, 21.1b. The inner or further bearing elements 20.1b, 21.1b thereby serve for the connection and bearing on an inner or further bearing acceptance 50.1b of the carrier 50. For the connection and/or guidance of the cover elements 20, 21 at the actuator 40 further acceptance elements 20.3 are intended, wherein fixing elements 40.3 of the actuator 40 for example are configured as mushroom heads and are arranged such that a lateral movement (meaning towards the outside) of the cover elements 20, 21 away from the actuator 40 is prevented. Further, behind the actuator 40 a drive 30 is arranged, which generates a mechanic (turning) movement, wherein the actuator 40 is moved along and the cover elements 20, 21 are driven for a movement between the open position I and the closed position II. The actuator 40 comprises cooling openings 40.5 in order to enable a cooling of the drive 30.

Figure 8:
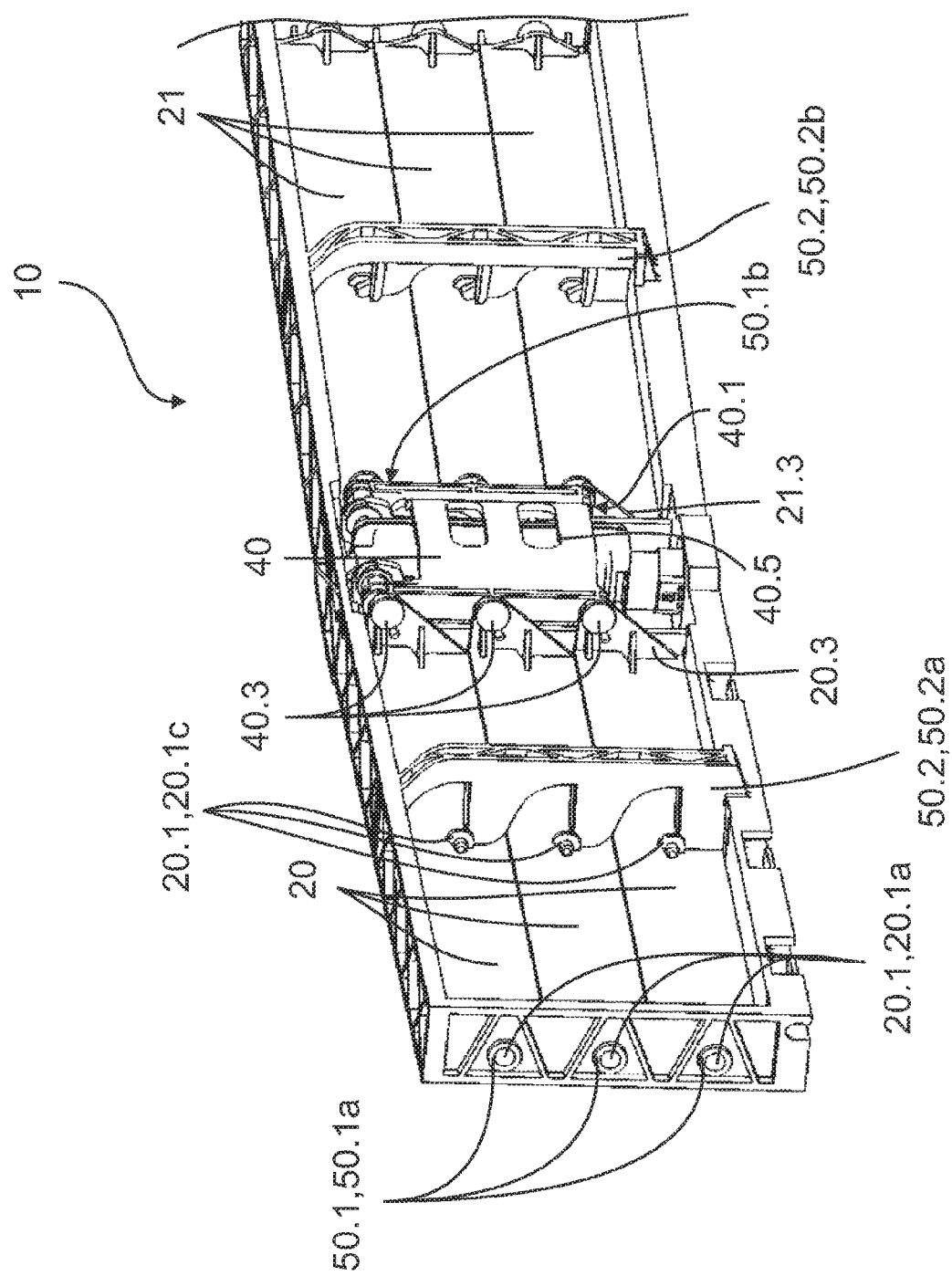

FIG. 8 shows an enlarged presentation of the device 10 according to the invention in a rear view. The cover elements 20, 21, particularly the cover means 20.2, 21.2, are pivotably mounted in the carrier 50. Like already described, herefore the cover elements 20, 21 comprise bearing elements 20.1, 21.1 connected with the cover means 20.2, 21.2. The bearing elements 20.1, 21.1 can for example be configured as bearing cones and correspond to corresponding bearing acceptances 50.1 of the carrier 50. Like shown in FIG. 8 thereby an outer or first bearing element 20.1a can be pivotably mounted or form fittingly connected in an outer or first bearing acceptance 50.1a of the carrier 50. In accordance therewith it applies for outer or first bearing elements 21.1a of the second cover elements 21 or cover means 21.2 and outer or first bearing acceptances 50.1a of the carrier 50 on the opposing side of the carrier 50. Further, in FIG. 8 central bearing elements 20.1c, 21.1c of the cover elements 20, 21 are shown, which are connected with cover means 20.2, 21.2 and are for example configured as acceptance elements for the bearing of a bearing cone of support elements 50.2. Thereby, a first support element 50.2a and a second support element 50.2b can be intended for a supporting of the first cover elements 20 and second cover elements 21, respectively, and by a central bearing element 20.1c, 21.1c of the cover elements 20, 21, respectively. The support elements 50.2 thereby enable an improved bearing of the cover elements 20, 21 and the carrier 50 and prevent further a bending of the cover elements 20, 21 and/or the cover means 20.2, 21.2 with a high contact pressure by the air entry through the opening 1. Further, in FIG. 8 acceptance elements 20.3, 21.3 of the cover elements 20, 21 can be recognized, which enable a form- and/or force-fitting acceptance and/or pivotable bearing at the first or outer fastening elements 40.1 of the actuator 40. Fixation elements 40.3 of the actuator 40 are thereby assembled such that a lateral movement (meaning towards the outside) of the cover elements 20, 21 or cover means 20.2, 21.2 away from the actuator 40 is prevented.

Figure 9:
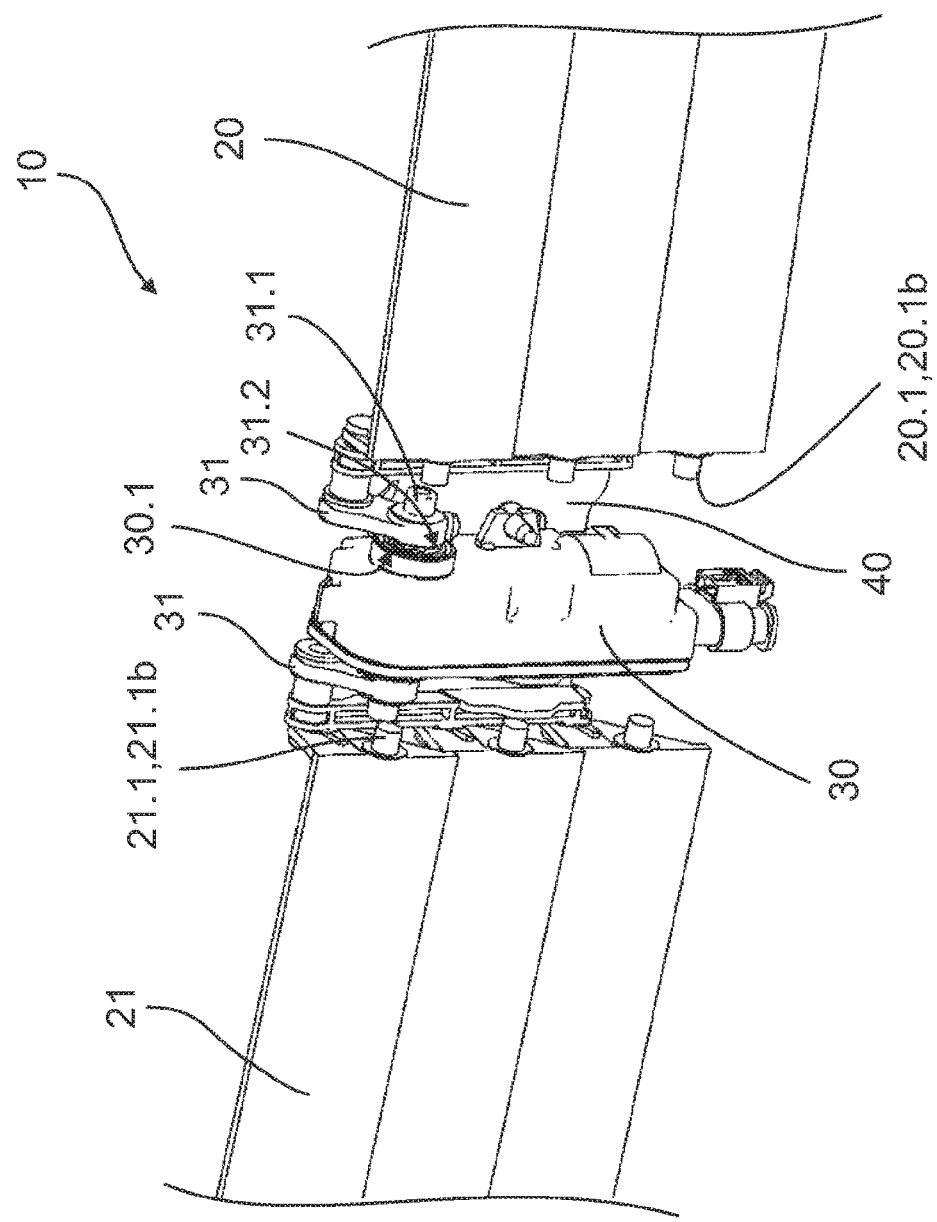

FIG. 9 shows an enlarged view of parts of the device 10 according to the invention, particularly a drive 30 of an actuator 40 and a connecting element 31. The drive 30 comprises a drive acceptance 30.1 in which a driveshaft 31.2 of the connecting element 31 is inserted. The driveshaft 31.2 is for example torque proof form- and/or force-fittingly connected with the drive acceptance 30.1 or is assembled in the drive acceptance 30.1. The drive 30 can for example be configured self-locking such that a movement or turning movement of the connecting element 31 can only be effected by the drive 30. The actuator 40 in turn is connected by a fastening element, particularly a second fastening element 40.2, with the connecting element 31 and therewith indirectly with the drive 30. The movement of the connecting element 31 to the drive 30 guides the actuator 40 in a movement, particularly in a circular path. Since the actuator 40 is connected via fastening elements, particularly first or outer fastening elements 40.1 with the cover elements 20, 21, the movement of the drive 30 is transferred to the cover elements 20, 21. The cover elements 20, 21 are pivotably mounted via bearing elements 20.1, 21.1 in the carrier 50 such that an operation of the drive 30 effects a turning of the cover elements 20, 21 in the carrier 50 and therewith a tilting of the cover means 20.2, 21.2 occurs wherein an opening 1 is released. Thereby, in FIG. 9 particularly the inner or further bearing elements 20.1b, 21.1b of the cover elements 20, 21 and the bearing means 31.1 of the connecting elements 31 are shown. By the bearing elements 20.1b, 21.1b the bearing of the cover elements 20, 21 in the carrier 50 or in a not shown central bar 51 occurs. The bearing means 31.1 are likewise supported in the carrier 50 or in the central bar 51.

Figure 10:
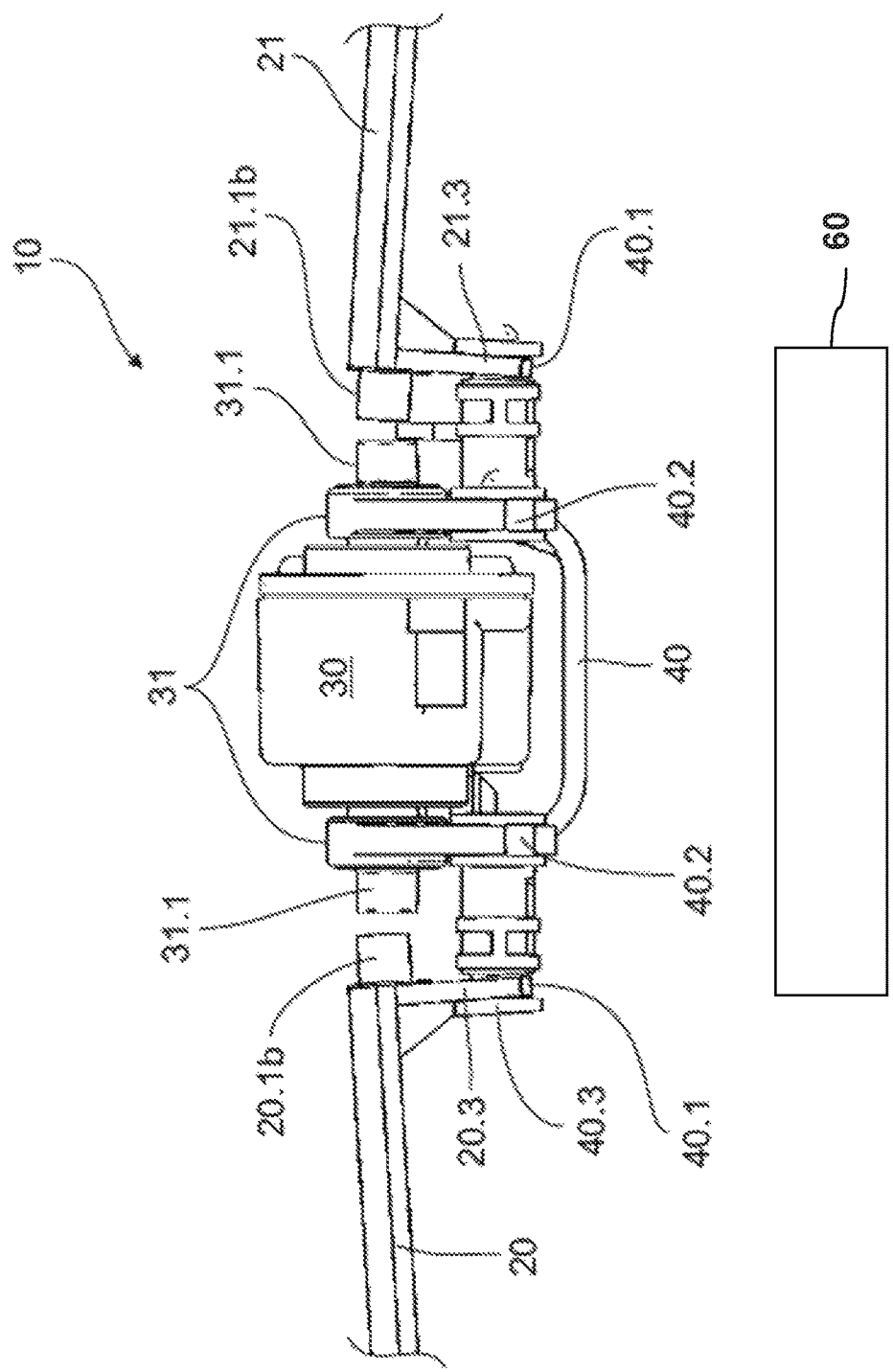

In FIG. 10 a top view on parts of the device 10 according to the invention is shown. Thereby, a drive 30 is shown wherein a connecting element 31 is driven by the drive 30. Thereby, the actuator 40 comprises a fastening element particularly a second or inner fastening element 40.2, which is connected with the connecting element 31 or pivotably mounted in the connecting element 31. The second (or inner) fastening element 40.2 is thereby adjusted mainly parallel towards the orientation of the drive 30 or of a drive acceptance 30.1 or the bearing means 31.1. Further, the actuator 40 comprises a further fastening element, particularly a first or outer fastening element 40.1, which is connected to the cover elements 20, 21 or pivotably mounted in the cover elements 20, 21 (meaning in at least one acceptance element 20.3, 21.3 of the cover elements 20, 21). The first (or outer) fastening element 40.1 is thereby configured rigid and/or torque proof with a second or inner fastening element 40.2 such that a movement of the actuator 40 at the same time relates to the second (inner) fastening element 40.2 and to the first (outer) fastening element 40.1. FIG. 10 also shows the location of radiator 60, disposed in the vehicle interior.

FIG. 11a and FIG. 11b show a schematic rear view of a device 10 according to the invention, wherein in FIG. 11a an open position I and in FIG. 11b a closed position II is shown. It can be recognized that the drive 30 is assembled in the center between a first cover element 20 and a second cover element 21. The cover elements 20, 21 thereby can be configured as a roller blind. In an open position I therefore the cover elements 20, 21 are wound up and are turned into a closed position II by rolling down. This is achieved by a movement of the drive 30 which for example transfers the turning movement via an actuator 40 to a shaft (for winding up up the roller blind) of the cover elements 20, 21. A turning in a first direction effects therewith a winding up up and a turning in the second direction a rolling down of the cover means 20.2, 21.2, which comprise for example an elastic material and/or textile. In order to enable a reliable transfer, particularly an angled transfer with an angular offset, thereby the actuator 40 is configured as a joint 40.4, particularly as a cardan joint.

In FIG. 12 schematically method steps of an assembly 100 according to the invention are shown. Thereby, in a first method step 100.1 a cover means 20.2, 21.2 is inserted deformation-free in a carrier 50. In a second method step 100.2 a bearing element 20.1, 21.1 is transferred in a bearing acceptance 50.1 of the carrier 50 connected with the cover means 20.2, 21.2. Subsequently, in a third method step 100.3 the cover element 20, 21 is transferred from an assembly position A in an operating position B by an axial shifting.

The previous description of the embodiments describes the present invention only within the scope of examples. Naturally the single features of the embodiments as far as technically meaningful can be freely combined with one another without leaving the scope of the present invention.

REFERENCE LIST

1 Opening
10 Device, cool air regulation device
20 Cover element, first cover elements
20.1 Bearing element, bearing cone
20.1a First outer bearing element
20.1b Further inner bearing element
20.1c Central bearing element
20.2 Cover means, flaps, lamella
20.3 Acceptance element for 40.1
21 Cover elements, second cover elements
21.1 Bearing element, bearing cone
21.1a First outer bearing element
21.1b Further inner bearing element
21.1c Central bearing element
21.2 Cover means, flaps, lamella
21.3 Acceptance element for 40.1
30 Drive
30.1 Drive acceptance
31 Connecting element, crank
31.1 Bearing means
31.2 Driveshaft
40 Actuator
40.1 First fastening element, fastening cone
40.2 Second fastening element, fastening cone
40.3 Fixation element for 40.1, mushroom head
40.4 Joint
40.5 Cool opening for 30
50 Carrier
50.1 Bearing acceptance
50.1a First outer bearing acceptance
50.1b Further inner bearing acceptance
50.2 Support element
50.2a First support element
50.2b Second support element
50.3 Free space for bearing acceptance
50.4 Restriction of bearing acceptance
50.5 Bearing means
50.6 Support means
51 Central bar
51.1 Cooling opening for 30
100 Assembly method
100.1 First method step
100.2 Second method step
100.3 Third method step
I Open position
II Closed position
A Assembly position
B Operating position

The invention claimed is:

1. A device for controlling an air stream to a radiator device of a vehicle, wherein the air stream is guidable through at least one opening to the radiator device comprising:
   at least one cover element for at least partially closing the opening in at least a closed position, each of the at least one cover element comprising:
      a bearing element extending outward from the cover element from a first end of the cover element, wherein the bearing element has a smaller cross-section than the cover element; and
   a carrier for installation and operation of the at least one cover element, the carrier comprising a bearing acceptance disposed to align with the bearing element of a corresponding cover element, the bearing acceptance comprising:
      a free space and a restriction, wherein the free space is adjusted to the form of the cover element and the restriction is adjusted to the form of the bearing element, such that the bearing element is introduced into the restriction and the cover element is introduced into the free space when the cover element is in an assembly position and such that the bearing element is supported by the restriction and the cover element is outside of the free space upon movement of the cover element along its longitudinal axis into an operating position.

2. The device according to claim 1, wherein the cover element and the bearing element are one piece.

3. The device according to claim 1, wherein the cover element is rigid and/or is arrangable rigidly in the carrier with the bearing element.

4. The device according to claim 1, wherein in the operating position an actuator for the transfer of a movement of a drive is detachably connected to a first cover element from the at least one cover element and a second cover element from the at least one cover element such that a transfer into the assembly position is prevented.

5. The device according to claim 4, wherein the actuator is directly connected with the first cover element via at least a first fastening element.

6. The device according to claim 1, wherein the cover element is turnable and/or shiftable between the assembly position and the operating position via an axial movement along the longitudinal axis, wherein in the assembly position the movement of the cover element into the closed position is prevented.

7. The device according to claim 1, wherein:
each of the at least one cover element further comprises a second bearing element extending outward from the cover element at a second end of the cover element;
the carrier further comprises a second bearing acceptance disposed to align with the second bearing element;
wherein, in the operating position, the bearing element and second bearing element of the cover element are pivotably supported in the bearing acceptance and second bearing acceptance of the carrier, respectively.

8. A method for the assembly of at least one cover element of a device for controlling an air stream to a radiator device of a vehicle, wherein the air stream is guidable through at least one opening to the radiator device, comprising:

providing a cover element that comprises at least a cover means for at least partially closing the opening in at least a closed position, wherein the cover element in an operating position is supported in a carrier such that a movement of the cover element between an open position for the at least partial release of the opening and the closed position is performable, and deformation-free mounting at least the cover means in an assembly position in the carrier;

deformation-free insertion of the cover element into the carrier, wherein a first bearing element of the cover element connected with the cover means is guided in a first bearing acceptance of the carrier; and shifting the cover element along a longitudinal direction from the assembly position into the operating position, wherein a further bearing element of the cover element is guided into a further bearing acceptance of the carrier.

9. The method according to claim 8, wherein, after the step of axial shifting, an arrangement of an actuator at the cover element occurs, wherein a repeated transfer into the assembly position is prevented.

10. The method according to claim 8, wherein the cover means is inserted for the assembly in the assembly position in a free space of a bearing acceptance of the carrier and for the transfer into the operating position is led out from the free space.

* * * * *